United States Patent [19]

Contreras et al.

[11] Patent Number: 5,296,975
[45] Date of Patent: Mar. 22, 1994

[54] HIGH-TRANSITION-RATE, LOW-SUPPLY-VOLTAGE WRITE DRIVER CIRCUITRY FOR MAGNETIC INDUCTIVE WRITE HEAD

[75] Inventors: John T. Contreras, San Jose; Stephen A. Jove, Watsonville; Klaas B. Klassen; Jacobus C. Leonardus van Peppen, both of San Jose, all of Calif.

[73] Assignee: International Business Machines Corporation, Armonk, N.Y.

[21] Appl. No.: 958,635

[22] Filed: Oct. 9, 1992

[51] Int. Cl.$^5$ ............... G11B 5/09; G11B 15/12; G11B 5/02
[52] U.S. Cl. .................... 360/46; 360/61; 360/68
[58] Field of Search ............ 360/46, 67, 68, 66, 360/65, 113, 119, 127, 63, 51, 40, 41, 42; 361/159, 160

[56] References Cited

U.S. PATENT DOCUMENTS

| | | | |
|---|---|---|---|
| 3,852,813 | 12/1974 | Petersen | 360/67 X |
| 4,423,442 | 12/1983 | Bitting et al. | 360/68 |
| 4,577,160 | 3/1986 | Lettun et al. | 360/67 X |
| 4,611,253 | 9/1986 | Kamei et al. | 360/66 |
| 4,713,700 | 12/1987 | Kuwahara et al. | 360/66 X |
| 4,879,610 | 11/1989 | Jove et al. | 360/67 |
| 4,974,114 | 11/1990 | Kammerer | 361/159 |
| 5,067,032 | 11/1991 | Ida | 360/68 X |
| 5,132,852 | 7/1992 | Price, Jr. | 360/46 |

OTHER PUBLICATIONS

IBM Technical Disclosure Bulletin, vol. 23, Apr. 1981, pp. 5167-5168.

*Primary Examiner*—Donald Hajec
*Assistant Examiner*—Thien Minh Le
*Attorney, Agent, or Firm*—Henry E. Otto, Jr.

[57] ABSTRACT

Writing of data on a storage disk by an inductive magnetic transducer is modulated by write driver circuitry that includes a supply voltage as low as three volts provided by a source referenced to ground, and a bias current source connected to either the supply voltage source or ground. Two bias control switches respectively direct the bias current to one or the other of two current gain circuits according to whether a positive or a negative input terminal has a preselected polarity. The gain circuits selectively respond to the bias currents supplied by the associated control switch for amplifying the bias current to remove a write current from a respective associated terminal of the transducer. Two current source switches connected to a respective one of the input terminals and to a respective one of the terminals of the transducer selectively allow and prevent the write current from flowing into the respective associated terminal of the transducer depending upon which of the input terminals has the preselected polarity. When data is not being written by the transducer, a controllable reference voltage circuit maintains the transducer at a potential at least as negative as ground to prevent electro-erosion of the transducer; and this circuit also is preferably connected to both gain circuits to prevent them from saturating.

14 Claims, 3 Drawing Sheets

HIGH-TRANSITION-RATE, LOW-SUPPLY-VOLTAGE WRITE DRIVER CIRCUITRY FOR MAGNETIC INDUCTIVE WRITE HEAD

This invention relates to disk storage systems employing circuitry for writing data on a magnetic storage disk with a magnetic transducer, such as an inductive magnetic head. It relates more particularly to write driver circuitry capable of modulating the writing of data with an inductive write head at high transition rates, and of operating at power supply voltages as low as three volts, and of protecting the head from electro-erosion when the head is not writing data.

BACKGROUND OF THE INVENTION

The most pertinent prior art of which applicants are aware is an article that appears in the IBM Technical Disclosure Bulletin, Vol. 23, April 1981, at pp. 5167–5168. This article describes a write driver circuit for use in a magnetic storage system that comprises four bipolar transistors. These transistors are arranged as upper and lower pairs in an "H" configuration to provide a bidirectional write current through a thin film inductive write head. To ensure fast switching, (i) saturation of the active one of the transducers of each pair is prevented by providing a sufficiently high supply voltage, and (ii) a low impedance path is provided to discharge the parasitic base capacitances of these active transistors upon turn off, so they will respond more rapidly when turned on. A write current source is interposed in series with a current switch in this H-configured write driver circuit.

While not a problem when supply voltage is high, there is a problem when supply voltages are as low as three volts because with such low voltages, saturation of the active transistors can occur and slow the rise time capability of the write driver circuit and thereby limit the data rate at which the circuit can operate. No means, other than employing a high supply voltage, is provided to prevent large differential inductive voltage transients from causing saturation of the then active transistor of the lower pair.

Disk storage systems are now being proposed that require low, single (grounded) supply voltages without saturating the active transistors, low power consumption, high transition (i.e., transfer) rates, and means for ensuring that no active transistors will saturate even when large differential inductive voltage transients exceed the supply voltage. This combination of attributes is not achievable with the above-cited and other prior art configurations known to applicants.

SUMMARY OF THE INVENTION

Writing of data on a storage disk by an inductive magnetic transducer is modulated by write driver circuitry that includes a supply voltage of as low as three volts provided by a source referenced to ground, and a bias current source connected to either the supply source or ground.

Two bias control switches respectively direct the bias current to one or the other of two current gain circuits according to whether a positive or a negative input terminal has a preselected polarity. The gain circuits selectively respond to the bias currents supplied by the associated control switch for amplifying the bias current to remove a write current from a respective associated terminal of the transducer. Two current source switches connected to a respective one of the input terminals and to a respective one of the terminals of the transducer selectively allow and prevent the write current from flowing into the respective associated terminal of the transducer depending upon which of the input terminals has the preselected polarity.

The write driver circuitry preferably includes a controllable reference voltage circuit operative, when data is not being written by the transducer, to maintain the transducer at a potential at least as negative as ground to prevent electro-erosion of the transducer. To achieve high data rates, the controllable reference voltage circuit is also desirably connected to both gain circuits to prevent them from saturating. A disabling circuit is also preferably included for preventing the write current from flowing through the transducer when the voltage is below the three volts or other preselected value. Each current gain circuit, bias control switch and current source switch has a configuration which is the mirror of its counterpart.

DESCRIPTION OF PREFERRED EMBODIMENT

Figure 1:
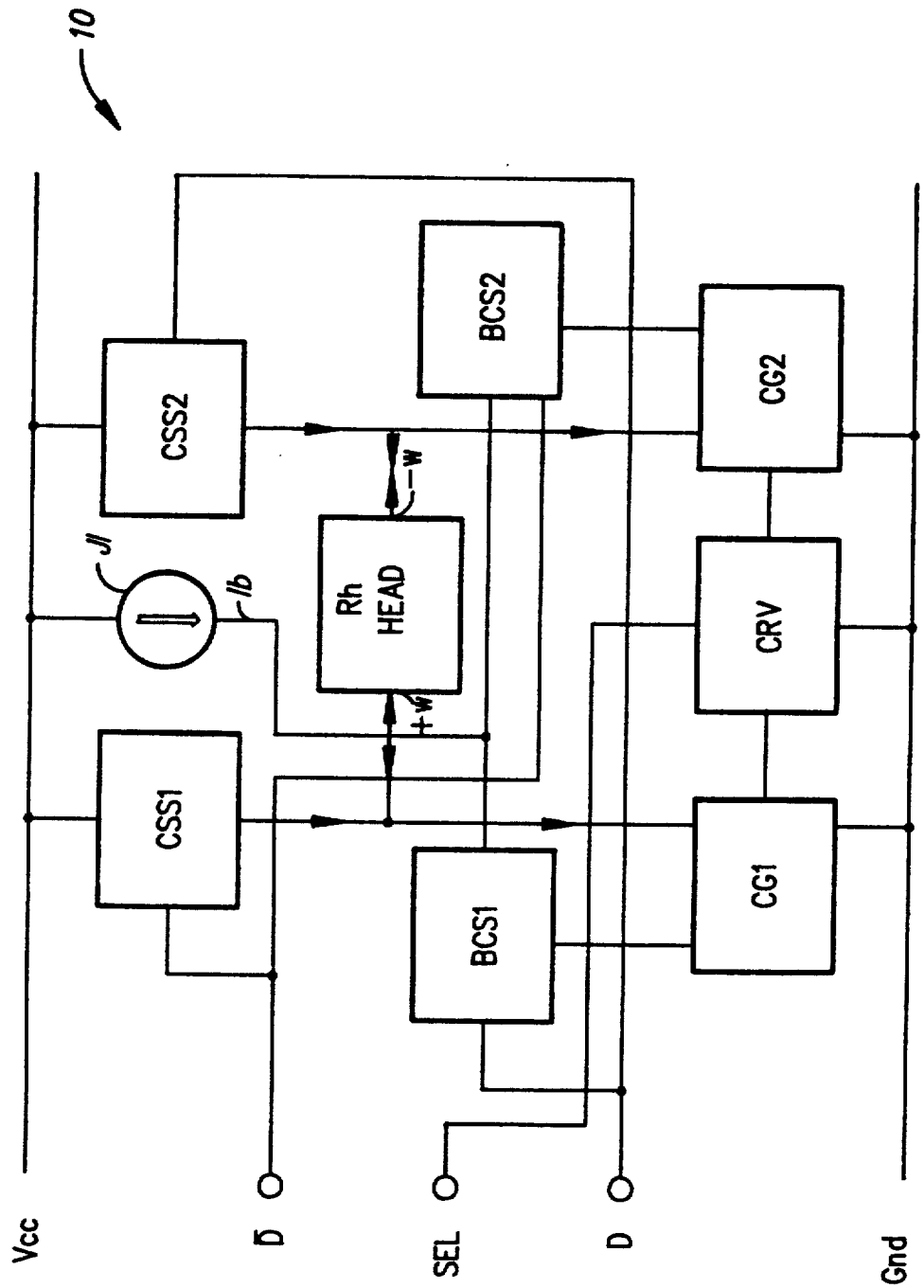
FIG. 1 is a block diagram of write driver circuitry embodying the invention.

As illustrated in FIG. 1, the write driver circuitry 10 embodying the invention comprises a supply voltage source Vcc referenced to ground, a source J1 deriving a bias current Ib from source Vcc, and positive and negative data input terminals D and D̄, respectively.

A bias control switch BCS1 directs the bias current Ib to a current gain circuit CG1 if data input terminal D is low; whereas a bias control switch BCS2 directs the bias current to a current gain circuit CG2 if data input terminal D̄ is low. Current gain circuit CG1 amplifies bias current Ib to remove the write current Iw from terminal +w of an inductive magnetic head Rh; whereas current gain circuit CG2 amplifies the bias current to remove the write current from terminal −w of the head. A current source switch CSS1 is connected to supply voltage source Vcc and to input terminal D and to head terminal +w; whereas current source switch CSS2 is connected to the supply voltage source and to input terminal D̄ and to head terminal −w.

When data input terminal D is high and D̄ is low, switch CSS1 will prevent the write current from flowing into terminal +w of the head and switch CSS2 will allow the write current to flow into terminal −w of the head. Conversely, when input terminal D is high and D̄ is low, write current flow into terminal −w will be prevented and current flow into terminal +w will be permitted.

A controllable reference voltage circuit CRV is interposed between a select line SEL and ground Gnd. The write driver circuitry is active when the select line is low and only one of the data inputs D or D̄ is high. The purpose of circuit CRV is to maintain the head at a potential substantially near ground to prevent electro-erosion of the pole tips of the head. To achieve high data rates, the circuit CRV should also be connected to the gain circuits CG1 and CG2 to prevent them from saturating; however, this connection is not necessary for proper operation at low data rates.

Figure 2:
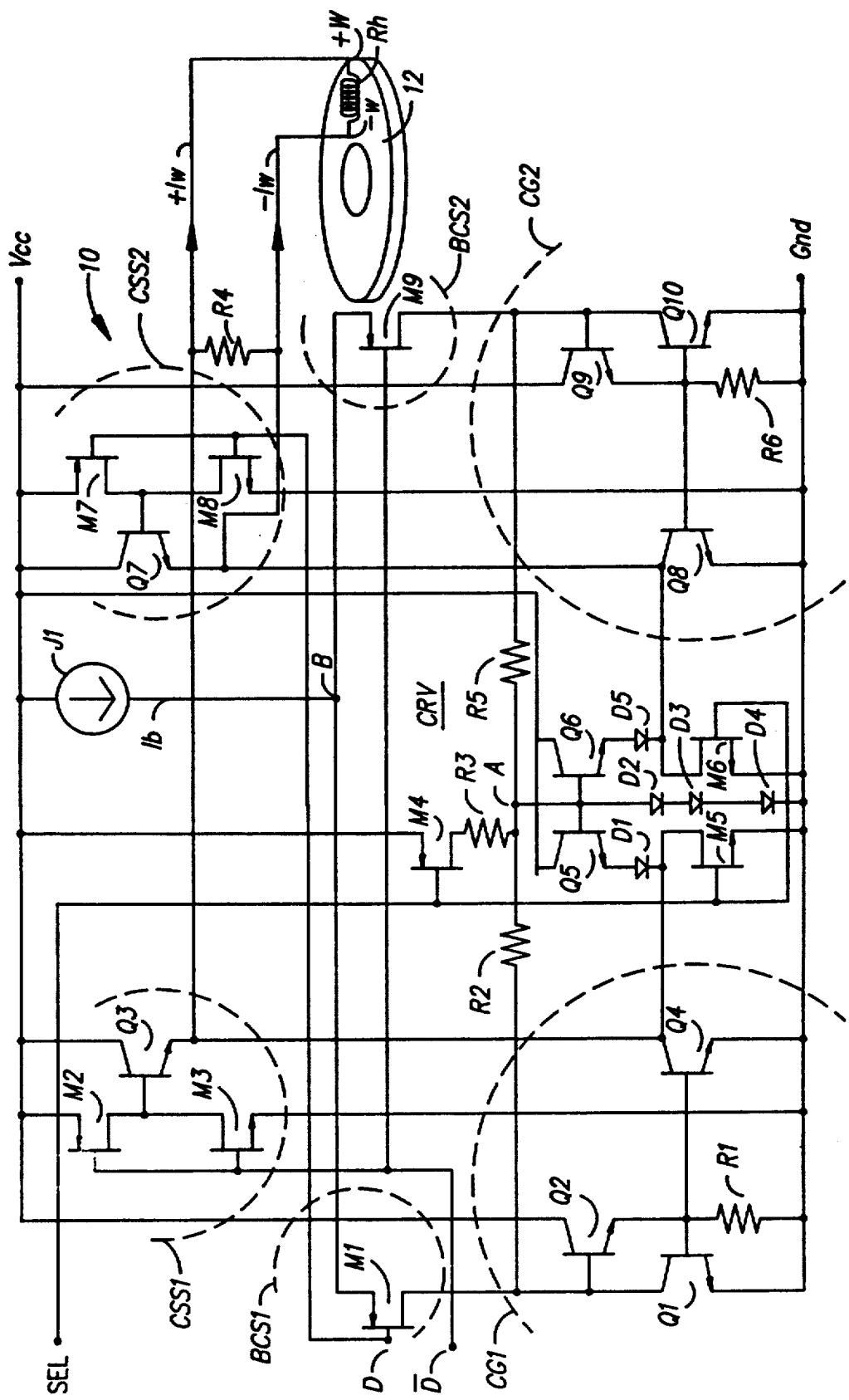
FIG. 2 is a more detailed schematic diagram of the circuitry depicted in FIG. 1.

Refer now to FIG. 2, which depicts in specific detail how the functions described in connection with FIG. 1 can be implemented. As illustrated in FIG. 2, the write driver circuitry 10 embodying the invention comprises NPN bipolar transistors Q1–Q10, field effect transistors (FETs) M1–M9 (of which M1, M2, M4, M7 and M9 are PFETs and M3, M5, M6 and M8 are NFETs), resistors R1–R6 and diodes D1–D5. As will be apparent from subsequent description, bias control switch BCS2, current source switch CSS2, and current gain circuit CG2 have configurations which are mirrors of those of BCS1, CSS1 and CG1, respectively.

Bias control switch BCS1 comprises FET M1 whose gate is connected to input terminal D and source is connected to current source J1. Bias control switch BCS2 comprises FET M9 whose gate is connected to input terminal $\overline{D}$ and whose source is connected to current source J1.

Current source switch CSS1 comprises FETs M2 and M3 whose gates are commonly connected to input terminal $\overline{D}$ and whose drains are connected to each other and to the base of transistor Q3. The sources of FETs M2 and M3 are connected to supply voltage source Vcc and to ground, respectively. Current source switch CSS2 comprises FETs M7 and M8 whose gates are connected to input terminal D and whose drains are connected to each other and to the base of transistor Q7. The sources of FETs M7 and M8 are connected to supply voltage source Vcc and to ground, respectively. The emitter of transistor Q3 is connected to terminal +w of write head Rh, and the emitter of transistor Q7 is connected to the terminal −w of the head. Resistor R4 shunts terminals +w and −w, and resistor R4 aids in dampening transient response from a change in current direction through the inductive write head Rh.

Current gain circuit CG1 comprises transistors Q1, Q2, Q4 and resistor R1. Transistor Q1 has its collector connected to the drain of FET M1 and to the base of transistor Q2 and to a resistor R2 of the controllable reference voltage circuit CRV. The bases of transistor Q1 and transistor Q4 are connected to the emitter of transistor Q2 and also via resistor R1 to ground. The emitters of transistors Q1 and Q4 are connected to ground.

Current gain circuit CG2 comprises transistors Q10, Q9, Q8 and resistor R6. Transistor Q10 has its collector connected to the drain of FET M9 and to the base of transistor Q9 and to resistor R5 of the controllable reference voltage circuit CRV. The bases of transistors Q10 and Q8 are connected to the emitter of transistor Q9 and also via resistor R5 to ground. The emitters of transistor Q10 and Q8 are connected to ground.

Controllable reference voltage circuit CRV comprises, in addition to resistors R2 and R5, resistor R3, transistors Q5 and Q6, diodes D1–D5, and FETs M4, M5 and M6. Resistors R2, R3 and R5 and the bases of transistors Q5 and Q6 are connected to a common node A. Node A is also connected to ground via serially connected diodes D2, D3 and D4. The collectors of transistors Q5 and Q6 are connected to supply voltage source Vcc. The emitter of transistor Q5 is connected via diode D1 to the collector of transistor Q4 and to the drain of FET M5. The emitter of transistor Q6 is connected via diode D5 to the collector of transistor Q8 and to the drain of FET M6. FETs M5 and M6 have their sources connected to ground, and their gates connected to a select line SEL. FET M4 also has its gate connected to select line SEL, its source connected to supply voltage source Vcc, and its drain connected to resistor R3 of the controllable reference voltage circuit CRV.

The write driver circuitry 10 above described modulates the writing of data by head Rh on a magnetic recording disk 12. Note that the ground connection Gnd is maintained at the same potential as that of the disk 12.

In operation, when line SEL is low and only one of the data inputs D or $\overline{D}$ is high, the write drive circuitry will be active. With line SEL low, PFET M4 will be on, and NFETs M5 and M6 will be off. With M4 on, the series connection of M4, resistor R3 and diodes D2, D3 and D4 creates a reference voltage at the anode of diode D2.

Because the input devices M1–M9 are FETs, complementary CMOS logic levels are provided for the data inputs D and $\overline{D}$. The status of select line SEL and of these CMOS logic levels and of the data inputs D and $\overline{D}$ determines whether the write driver circuitry 10 is active or inactive.

Assume initially that line SEL is low and either data input D or $\overline{D}$ are high. Under this condition, write driver circuitry 10 will be active. The low signal in line SEL will turn on PFET M4 and cause it to turn off NFETs M5 and M6 and concurrently, via resistor R3 and diodes D2, D3, D4, create a reference voltage at node A.

If D is high and $\overline{D}$ low, with line SEL now low PFET M1 will be off and PFET M9 will be on, allowing bias current Ib to flow through M9. Meanwhile, FETS M7 and M8 will invert data input D and bring the voltage at the base of transistor Q7 close to the potential of the ground connection Gnd, thereby restricting the flow of write current Iw via the emitter of transistor Q7 to terminal −w of the head. Concurrently, PFETs M2 and M3 will invert the $\overline{D}$ input and bring the voltage at the base of transistor Q3 close to that of power supply Vcc, allowing the write current Iw to flow via the emitter of transistor Q3 from terminal +w to terminal −w of the head.

Meanwhile, data input $\overline{D}$ will turn on FET M9 and allow the bias current Ib to turn on transistor Q9 and cause it to turn on transistors Q8 and Q10. This permits the full amount of write current to flow from source Vcc, via the collector/emitter of transistor Q3, terminals +w and −w of head Rh and the collector/emitter of transistor Q8 to ground in a positive direction. With data input D high, FET M1 will be off; and hence transistors Q1 Q2 and Q4 will not affect the write current Iw.

As earlier noted, the circuitry for driving the write current Iw in a negative direction through the head Rh is symmetrical. Thus if $\overline{D}$ is high and D is low while line SEL is low, PFET M9 will be off and PFET M1 will be on, allowing bias current Ib to flow through M1. Meanwhile, PFET M2 and NFET M3 will invert data input D and bring the voltage at the base of transistor Q3 close to the potential of the ground connection Gnd thereby restricting the flow of write current Iw via the emitter of transistor Q3 to terminal +w of the head. Concurrently, PFET M7 and NFET M8 will invert the D input and bring the voltage at the base of transistor Q7 close to that of power supply Vcc, allowing the write current Iw to flow via the emitter of transistor Q7 from terminal −w to terminal +w of the write head.

According to features of the invention, the resistors R2 and R5 connected to node A are large in value (e.g., >40,000 ohms). The small currents through resistors R2 and R5 provide a trickle current through the collectors of transistors Q1 and Q10. This keeps transistors Q1, Q2, Q4, Q8, Q9 and Q10 on with a small amount of collector current through transistors Q4 and Q8. The purpose of this small collector current is to increase the transition rate by keeping these transistors on. In addition, transistors Q5 and Q6 in combination with diodes D1 and D5, respectively, of the controllable reference voltage circuit CRV restrict transistors Q4 and Q8 from going into saturation, thereby enhancing the transition rate. If these transistors were allowed to saturate, the transistors would be slower in changing current direction through the inductive write head Rh. Resistor R4 dampens the response of the write circuit Iw through the inductive write head and thereby reduces the settling time of the write current after a transition.

To reduce power consumption, write current Iw can be multiplied by increasing the ratio of transistors Q4 to Q1 and of transistors Q8 to Q10. The ratio increase can be achieved by using multiple discrete transistors or by increasing the areas for Q4 and Q8. Transistors Q2 and Q9 reduce the effects of beta variations in transistors Q1, Q4, Q8 and Q10. Also resistors R1 and R6 affect the transition time for switching current direction through the head.

If write driver circuitry 10 is used in a multiple port configuration, the circuitry in FIG. 2 should be replicated for each port. In such event, node B, supply source Vcc and the ground connection Gnd would be common nodes for all of the write driver ports; and data inputs D and $\overline{D}$ would be multiplexed between the driver ports and controlled independently for each port.

It will be understood that, if desired, the write driver circuitry above described may be modified by interchanging the supply voltage source Vcc and ground connection Gnd. In this event, PNP transistors would be substituted for the NPN transistors Q1-Q10, NFETs would be substituted for PFETs M1, M2, M4, M7, and M9, PFETs would be substituted for NFETs M3, M5, M6 and M8, and all devices including bias current source J1 that are shown as connected to source Vcc would be connected to Gnd and conversely.

A computer simulation of the write current Iw through the inductive write head Rh showed that with a supply voltage of three volts a rise time of less than 11 ns was achieved with data rates of at least five megabytes with typical write current values and write head characteristics.

The write driver circuitry 10, as thus far described, will operate satisfactorily. However, the power supply monitoring circuit 20 illustrated in FIG. 3 is preferably added to the write driver circuitry 10 of FIG. 2 in order to insure that the write drive circuitry will be rendered inactive when the power supply voltage from Vcc is below a preselected value.

Figure 3:
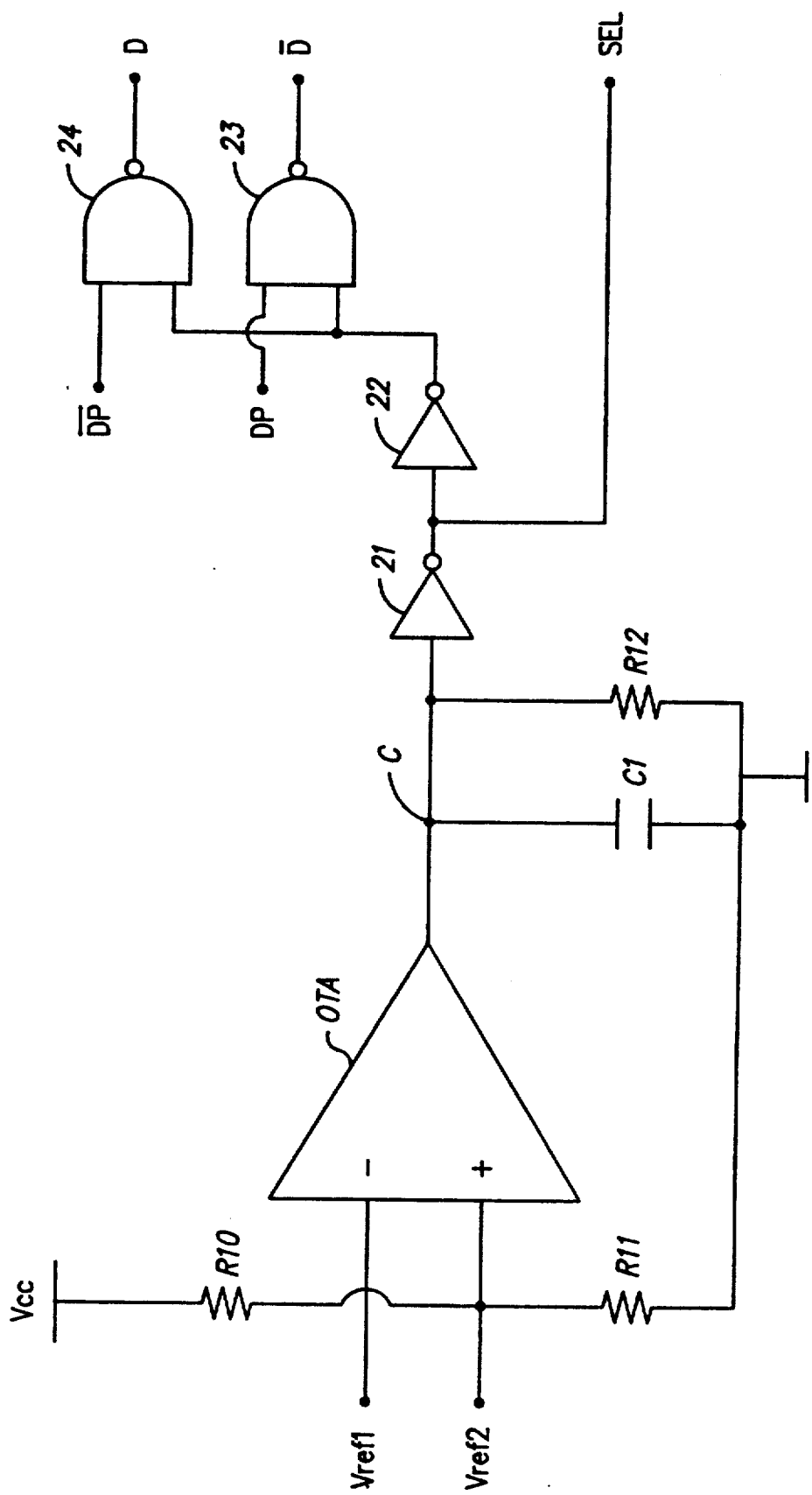
FIG. 3 is a schematic diagram of an optional disabling circuit which preferably is added to the circuitry depicted in FIG. 2.

As illustrated in FIG. 3, circuit 20 comprises a reference voltage source Vref1 that provides a reference voltage with a relatively small tolerance variation as compared to that of power supply source Vcc. Resistors R10 and R11 are connected in series from source Vcc to ground to create a voltage Vref2 that is proportional to the power supply voltage. An operational transconductance amplifier OTA generates a current from the difference in voltage of Vref1 and Vref2. The output of the OTA is connected to capacitor C1, resistor R12 and the input of an inverter 21. The output of inverter 21 connects to the input of another inverter 22 and also to select line SEL (described in FIGS. 1 and 2). The output of inverter 22 is connected to the inputs of two NAND gates 23, 24. The other inputs to NAND gates 23 and 24 are DP and $\overline{DP}$, respectively. These inputs DP and $\overline{DP}$ constitute the data inputs when using a monitoring circuit 20, and the outputs of NAND gates 23 and 24 are D and $\overline{D}$, respectively.

The ratio of the resistances of resistors R10 and R11 determine the preselected value below which the write driver circuitry 10 is deactivated. While the voltage of Vref2 is substantially more positive than that of Vref1, the power supply voltage will be above the preselected value and a current will flow to node C, to which capacitor C1 and resistor R12 are connected in parallel. Under this condition, a dc bias current will flow through resistor R12 and create a dc voltage, and any ac current will be bypassed through capacitor C1. The dc voltage will be above the threshold voltage of inverter 21, and this will make the select line SEL low. The output of the inverter 22 will be high and allow both inputs DP and $\overline{DP}$ to pass through the respective NAND gates 22 and 23 and render the write driver circuitry 10 active.

When the voltage of Vref1 is substantially more positive than that of Vref2, the power supply voltage Vcc will be below the preselected value. Under this condition, bias current will flow from node C; and since the output current of the OTA is limited, the output voltage of the OTA will be limited between ground and that of Vcc. As a result, the dc voltage will be below the threshold voltage of inverter 21, with the result that select line SEL and the NAND outputs D and $\overline{D}$ will be high. Consequently, the NAND gates 23 and 24 will not pass the inputs DP and $\overline{DP}$, and with line SEL and D and $\overline{D}$ high, the write driver circuitry 10 will be rendered inactive.

While the invention has been shown and described with respect to a preferred embodiment thereof, it will be understood by those skilled in the art that changes in form and detail may be made therein without departing from the scope and teaching of the invention. Accordingly, the embodiment as herein disclosed is to be considered merely as illustrative and the invention is to be limited only as specified in the claims.

We claim:

1. Circuitry for modulating the writing of data on a magnetic storage disk, said circuitry comprising:
   a single supply voltage source referenced to ground;
   a source providing a bias current and connected to either said supply voltage source or ground;
   an inductive magnetic transducer for writing the data on the disk;
   positive and negative data input terminals;
   two current gain circuits;
   two bias control switches, each respectively directing the bias current to one or the other of the gain circuits according to which of said input terminals is at a preselected polarity;
   said gain circuits each selectively responsive to the bias current directed by an associated control switch for amplifying the bias current to remove a write current from a respective associated terminal of the transducer; and
   two current source switches, each current source switch and an associated one of the gain circuits being connected in series between the supply voltage source and ground via respective separate paths that extend in parallel between the supply voltage source and ground, and each current source switch being connected to a respective one of the input terminals and to a respective different one of the terminals of the transducer for selectively allowing and preventing the write current from flowing into its respective associated terminal of the transducer depending upon which of said input terminals is at said preselected polarity.

2. The circuitry of claim 1, including a controllable reference voltage circuit connected to the transducer via the gain circuits and operative, when data is not being written by the transducer, to maintain the transducer at a potential at least as negative as ground to prevent electro-erosion of the transducer.

3. The circuitry of claim 1, including a controllable reference voltage circuit connected to both said current gain circuits to prevent them from saturating.

4. The circuitry of claim 1, including a controllable reference voltage circuit to which each of said terminals of the transducer is connected via a respective one of the gain circuits and operative, when data is not being written by the transducer, to maintain the transducer at a potential at least as negative as ground to prevent electro-erosion of the transducer and operative, when data is being written by the transducer, to prevent saturation of the gain circuits to avoid a slowing of current change through the transducer.

5. The circuitry of claim 1, wherein the supply voltage is as low as three volts.

6. The circuitry of claim 1, including a disabling circuit for preventing the write current from flowing through the transducer when the supply voltage is below a preselected value.

7. The circuitry of claim 1, wherein each gain circuit, bias control switch and current source switch has a configuration which is the mirror of its counterpart.

8. A data storage system comprising:
a data storage disk;
an inductive magnetic transducer for writing data on the disk; and
write driver circuitry including:
a single supply voltage source referenced to ground;
a source providing a bias current and connected to either the supply voltage source or ground;
positive and negative data input terminals;
two current gain circuits;
two bias control switches, each respectively directing the bias current to one or the other of the gain circuits according to which of said input terminals is low;
one of said gain circuits being responsive to the bias current to amplify the bias current to remove a write current from one terminal of the transducer when one of said input terminals is low, and the other gain circuit being responsive to the bias current to amplify the bias current to remove the write current from another terminal of the transducer when the other input terminal is low; and
two current source switches, each current source switch and an associated one of the gain circuits being connected in series between the supply voltage source and ground via respective separate paths that extend in parallel between the supply voltage source and ground, and each current source switch being connected to a respective one of the input terminals and to a respective one of the terminals of the transducer for alternatively preventing or allowing the write current from flowing into an associated respective terminal of the transducer according to which of the input terminals is low.

9. A method for modulating the writing of data on a magnetic storage disk by an inductive magnetic transducer, said method comprising the steps of:
providing a single supply voltage source referenced to ground;
deriving a bias current from a source connected either to the supply voltage source or ground;
providing two current source switches;
connecting each current source switch and an associated one of two gain circuits in series between the supply voltage source and ground via respective separate paths that extend in parallel between the supply voltage source and ground;
directing the bias current to one or the other of the gain circuits according to whether a positive or a negative input terminal is at a preselected polarity; and
amplifying the directed bias current for removing a write current from one of the two terminals of the transducer, and concurrently allowing the write current to flow into the other terminal of the transducer.

10. The method of claim 9, including the step of, when data is not being written by the transducer, maintaining the transducer at a potential at least as negative as ground to prevent electro-erosion of the transducer.

11. The method of claim 9, including the step of controlling a reference voltage to both of the gain circuits to prevent them from saturating.

12. The method of claim 9 wherein the supply voltage is as low as three volts.

13. The method of claim 9, including the step of preventing the write current from flowing through the transducer when the supply voltage is below a preselected value.

14. Circuitry for modulating the writing of data on a magnetic storage disk, comprising:
a single supply voltage source referenced to ground;
an inductive write transducer;
a pair of current source switches each for selectively supplying a write current to a respective terminal of the transducer;
two data input terminals;
a pair of current gain circuits;
each current source switch and an associated one of the gain circuits being connected in series between the supply voltage source and ground via separate parallel paths; and
two bias control switches, each for respectively directing a bias current to an associated one of the gain circuits according to which of said input terminals is at a preselected polarity for causing the gain circuit receiving the bias current to amplify it to remove the write current from an associated terminal of the transducer.

* * * * *

UNITED STATES PATENT AND TRADEMARK OFFICE
CERTIFICATE OF CORRECTION

PATENT : 5,296,975
DATED : Mar. 22, 1994
INVENTOR(S) : John T. Contreras

It is certified that error appears in the above-identified patent and that said Letters Patent is hereby corrected as shown below:

Column 2, line 37, delete "D", insert -- $\bar{D}$ --.
Column 2, line 48, delete "D", insert -- $\bar{D}$ --.
Column 2, line 52, delete "D", insert -- $\bar{D}$ --.
Column 3, line 9, delete "PEETs", insert -- PFETs --.

Signed and Sealed this

Fourteenth Day of March, 1995

Attest:

BRUCE LEHMAN

*Attesting Officer*     *Commissioner of Patents and Trademarks*